United States Patent [19]

Anhegger et al.

[11] Patent Number: 5,031,302
[45] Date of Patent: Jul. 16, 1991

[54] METHOD OF MAKING A FILLER PIPE FOR A FUEL TANK OF A MOTOR VEHICLE

[75] Inventors: Sigmund Anhegger; Josef Oesterle, Rammingen; Erwin Goetz, Weil der Stadt, all of Fed. Rep. of Germany

[73] Assignee: Dr. Ing. h.c.F. Porsche AG, Fed. Rep. of Germany

[21] Appl. No.: 462,782

[22] Filed: Jan. 10, 1990

Related U.S. Application Data

[62] Division of Ser. No. 260,730, Oct. 14, 1988, Pat. No. 4,915,249.

[30] Foreign Application Priority Data

Oct. 14, 1987 [DE] Fed. Rep. of Germany ....... 3734782

[51] Int. Cl.⁵ ............................................ B21D 39/00
[52] U.S. Cl. ........................................ 29/516; 29/523; 29/890.14
[58] Field of Search ............... 29/516, 522.1, 523, 29/890.14; 220/85 F, 81 R, 85 R, 85 RS, 86 R, 85 S, DIG. 33; 277/208, 209, 210

[56] References Cited

U.S. PATENT DOCUMENTS

| | | | |
|---|---|---|---|
| 2,245,154 | 6/1941 | McWane | 277/208 |
| 2,615,740 | 10/1952 | Nathan | 277/209 |
| 3,325,174 | 6/1967 | Weaver | 277/209 |
| 4,185,844 | 1/1980 | Hubbard | 220/86 R |
| 4,747,508 | 5/1988 | Sherwood | 220/85 UR |
| 4,782,974 | 11/1988 | Elkayam | 220/85 F |
| 4,813,453 | 3/1989 | Jenkins | 220/85 VS |

FOREIGN PATENT DOCUMENTS 0210322 1/1986 European Pat. Off. .
3027002 2/1982 Fed. Rep. of Germany .

Primary Examiner—Timothy V. Eley
Attorney, Agent, or Firm—Evenson, Wands, Edwards, Lenahan & McKeown

[57] ABSTRACT

A filler pipe for a fuel tank of a motor vehicle includes at its cap end a cylindrical insert whereby an elastic sealing ring is arranged between an outer surface of the insert and an inner surface of the filler pipe made of plastic material. In order that a simple cost-favorable connection between the insert and the filler pipe is achieved combined with a good seal, the profiled sealing ring having an elongated cross-sectional shape is mounted on the insert under prestress. Furthermore, the insert and sealing ring are subjected to a common blow-molding operation.

11 Claims, 2 Drawing Sheets

METHOD OF MAKING A FILLER PIPE FOR A FUEL TANK OF A MOTOR VEHICLE

This is a divisional of application Ser. No. 260,730, filed Oct. 14, 1988, now U.S. Pat. No. 4,915,249.

BACKGROUND AND SUMMARY OF THE INVENTION

The present invention relates to a filler pipe for a fuel tank of a motor vehicle which is provided at its cap end with a cylindrical insert whereby an elastic sealing ring is arranged between an outer surface of the insert and an inner surface of the filler pipe made of plastic material.

With a known arrangement of the aforementioned type (EP-A 0 210 322) an insert made of metal is inserted into a preassembled hollow cylindrical extension of the filler pipe made of plastic material, whereby for axially fixing of the insert a flange connection is realized subsequently between the insert and the filler pipe. Furthermore, an elastic sealing ring is clamped-in between an outer surface of the insert and an inner surface of the filler pipe, which is formed by an O-ring.

This arrangement entails the disadvantage that for purposes of the connection of the filler pipe and insert, several time-consuming and cost-intensive operating steps are necessary, as a result of which the manufacturing costs are increased. Additionally, an annular groove has to provided at the insert for the axial fixation of the O-ring because the O-ring would otherwise displace in the axial direction.

It is the object of the present invention to provide a simple cost-favorable connection between the insert and filler pipe. Therebeyond, a functionally correct sealing between insert and filler pipe is to be assured.

The underlying problems are solved according to the present invention in that the sealing ring has a profiled elongated cross-sectional shape and is mounted on the insert under prestress and in that the sealing ring and the insert are fixed by the externally disposed filler pipe.

The principal advantages achieved with the present invention reside in that an automatic fastening for the sealing ring in the axial direction is achieved by the profiled elongated sealing ring mounted under prestress on the insert. A simple cost-favorable connection between the insert and the filler pipe is achieved by the common blow-molding of the insert and of the sealing ring. The grooves provided at the inner surface of the sealing ring assure that the sealing ring cannot displace itself along the outer surface of the insert. The cross-sectional enlargements provided at the outer surface of the sealing ring effect a good form-locking connection between the sealing ring and the filler pipe. If fuel should reach the sealing ring, then the sealing ring made of rubber or plastic material will swell, and the seal between the insert and filler pipe is additionally improved. It is achieved by the flat elongated shape of the sealing ring that it is also reliably retained in position during the relatively high pressures which occur during the blow-molding operation. An additional securing of the sealing ring in the axial direction is achieved in that radial beads are locally provided at the insert, on which the sealing ring is mounted.

BRIEF DESCRIPTION OF THE DRAWINGS

These and other objects, features and advantages of the present invention will become more apparent from the following description when taken in connection with the accompanying drawing which shows, for purposes of illustration only, two embodiments in accordance with the present invention, and wherein.

DETAILED DESCRIPTION OF THE DRAWINGS

Figure 1:
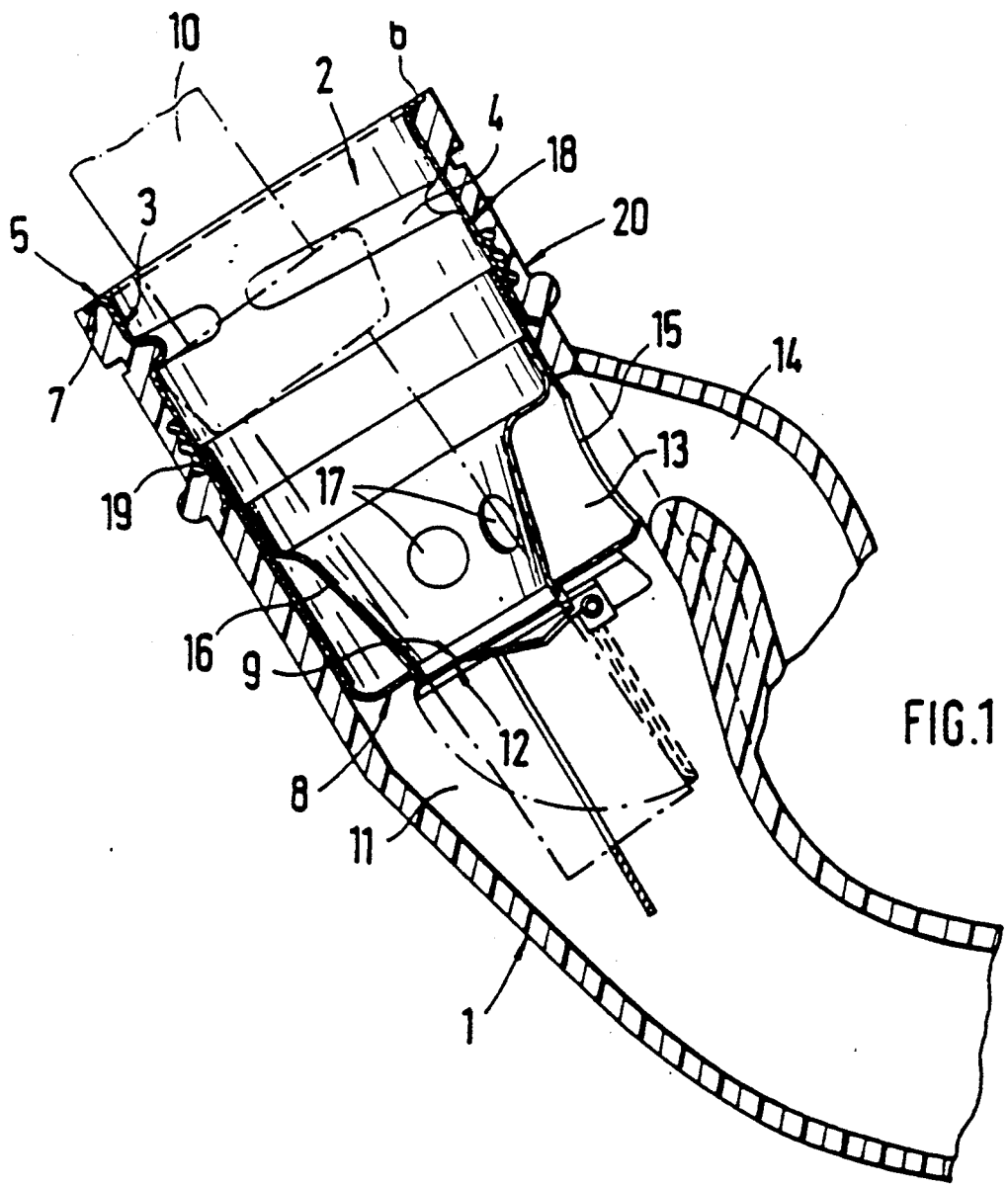
FIG. 1 is a longitudinal cross-sectional view through a filler pipe of a fuel tank in accordance with the present invention.

Referring now to the drawing wherein like reference numerals are used throughout the various views to designate like parts, FIG. 1 illustrates a partial area of a filler pipe generally designated by reference numeral 1 and made of plastic material whose one end is connected with a fuel tank (not shown) of a motor vehicle. The other end 2 of the filler pipe 1, which is located remote from the fuel tank, is provided with a cylindrically constructed insert 3 which receives a closure cap (not shown). The insert 3 preferably made of metal has internally a thread 4 which cooperates with an external thread of the closure cap.

According to FIG. 1, the insert 3 is provided at its upper open end 5 with an outwardly directed flange 6 which is supported sectionwise at an end face 7 of the filler pipe 1. A bottom section 8 of the insert 3 which is located in the lower area, closes the pipe section 11 of the filler pipe 1 leading to the fuel tank with the exception of a through-opening 9 for a filling nozzle 10 indicated in dash and dot lines, whereby the through-opening 9 is provided with a pivotal spring-loaded flap 12.

The insert 3 made of several parts includes above the through-opening 9 an annular space 13 which is in communication with a vent line 14 of the filler pipe 1. The vent line 14 is connected laterally at the filler pipe 1 and to an opening 15 of the annular space 13. Several apertures 17 are provided at an inner conical wall 16 forming the annular space 13, through which the air can flow in the direction to the closure cap.

Figure 2:
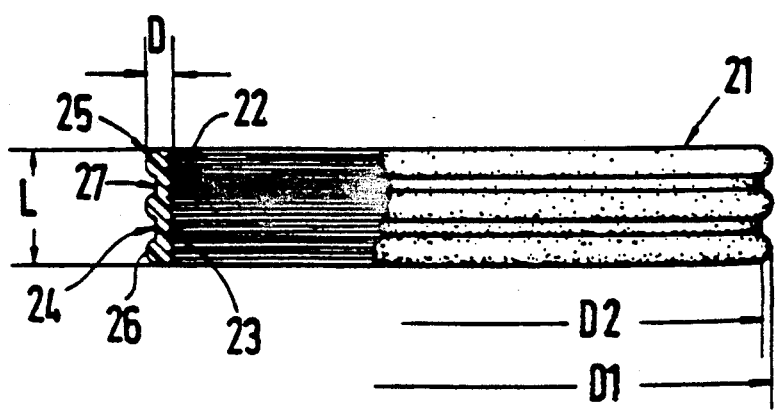
FIG. 2 is a view, partly in cross section, and on an enlarged scale, of the sealing ring according to FIG. 1.

An elastic sealing ring 21 is arranged above the annular space 13 between an outer surface 18 of the insert 3 and an inner surface 19 of a hollow cylindrical section 20 in the upper end area of the filler pipe 1. According to FIGS. 1 and 2, the profiled sealing ring 21 having an elongated cross-sectional shape is mounted under prestress on the outer surface 18 of the insert 3 at any desired place. The insert 3 together with the sealing ring 21 is connected form-lockingly by blow-molding with the externally disposed hollow cylindrical section 20 of the filler pipe 1. This takes place in such a manner that the insert 3 together with the emplaced sealing ring 21 is placed into a blow mold and is subsequently subjected to a blow-molding operation so that the filler pipe 1 surrounds sectionwise the insert 3 and the sealing ring 21. The radial pressure of the sealing ring 21 is attained by the blow-molding.

The sealing ring 21 made of suitable material such as rubber or plastic material includes at its inner surface several grooves 23 placed alongside one another. The radially extending groove 23 are—as viewed in cross section—constructed saw-tooth-like. According to FIG. 2, the grooves 23 are arranged over the entire length L of the sealing ring 21. An axial displacement of the sealing ring 21 during the blow-molding is prevented by the grooves 23 having a slight height and by the flat elongated shape of the sealing ring 21. At its outer surface, the sealing ring 21 is provided locally with cross-sectional enlargements 25. According to FIG. 2, three semi-circularly shaped cross-sectional enlargements 25 arranged at a distance to one another are provided. The cross-sectional enlargements 25 are formed by the semi-circularly shaped beads 26. However, the possibility also exists that the beads be constructed wave-shaped, triangularly shaped, rectangularly shaped or the like. One cylindrical connecting area 27 each is provided between two adjacent beads 26 whereby the connecting area 27 has an outer diameter D2 which is smaller than the outer diameter D1 of the beads 26. The ratio of the length L to the maximum thickness D of the sealing ring 21 amounts to about 2.5 : 1 to 5 : 1, i.e., the length of the sealing ring 21 is about 2.5 to 5 times as large as its maximum thickness. If fuel penetrates into the gap area between the insert 3 and the filler pipe 1 and reaches the sealing ring 21, the latter swells up and effects an improved seal so that no fuel can leave into the atmosphere by way of the sealing ring 21.

Figure 3:
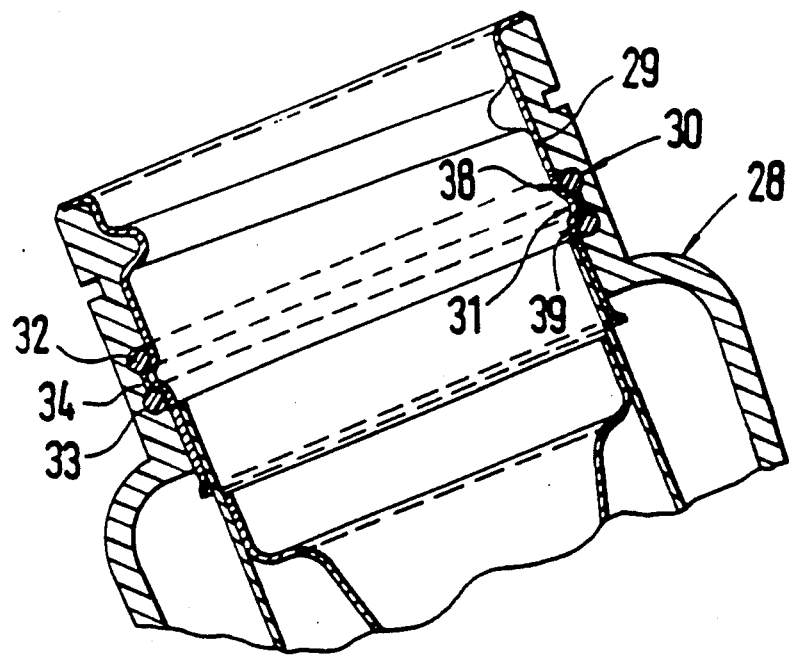
FIG. 3 is a longitudinal cross-sectional view corresponding to FIG. 1, of a further embodiment of a filler pipe in accordance with the present invention.
Figure 4:
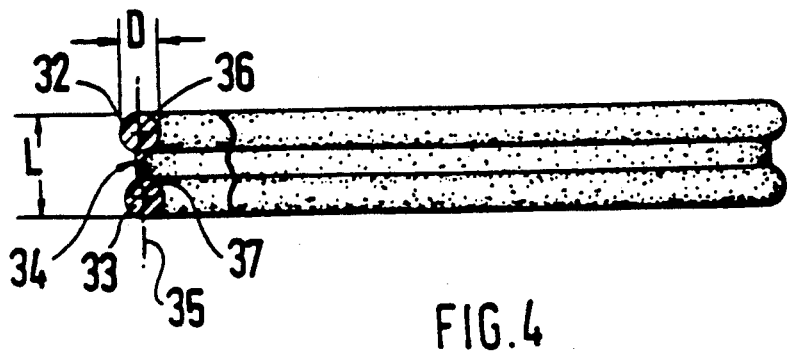
FIG. 4 is a view, partly in cross section, and on an enlarged scale, of the sealing ring according to FIG. 3.

FIG. 3 illustrates a second embodiment of a filler pipe 28 whereby radial beads 31 are locally provided at an insert 29 within the area of a sealing ring 30 which effect an additional fixing of the sealing ring 30.

The beads 31 are constructed spherically shaped. The sealing ring 30 cooperating with the beads 31 is composed—as viewed in cross section—of two end-face circularly shaped sections 32 and 33 which are connected with each other by a thin-walled web 34. The web 34 extends in an auxiliary plane 35 which connects with each other the center points 36 and 37 of the circularly shaped sections 32 and 33 that are disposed one above the other.

The spherically shaped beads 31 have such a size that the spaced circularly shaped sections 32 and 33 of the sealing ring 30 are supported section wise at the mutually facing radii 38 and 39.

The web 34 bulges locally in the outward direction owing to the beads 31.

While we have shown only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method of manufacturing a filler pipe arrangement for a fuel tank of a motor vehicle comprising:
   providing a filler pipe with an inner surface of plastic materials,
   providing a cylindrical insert means at a filler cap end of the filler pipe,
   disposing an elastic sealing ring means between an outer surface of the insert means and the inner surface of the filler pipe made of plastic material, the sealing ring means having a profiled elongated cross-sectional shape,
   and mounting the sealing ring means on the insert means under prestress with the sealing ring means and the insert means being fixed by the filler pipe disposed externally thereof.

2. A method according to claim 1, comprising placing the insert means together with the sealing ring means into a blow-molding tool where it is fixed by holding means, and subsequently subjecting the insert means and sealing ring means to a common blow-molding operation.

3. A method according to claim 1, wherein the sealing ring means is provided at its inner surface with several adjacent grooves.

4. A method according to claim 3, wherein said grooves are constructed saw-tooth-like, as viewed in cross section.

5. A method according to claim 1, wherein the sealing ring means includes cross-sectional enlargements locally provided at its outer surface.

6. A method according to claim 5, wherein the cross-sectional enlargements are formed by substantially semi-circularly shaped beads.

7. A method according to claim 5, wherein a cylindrical connecting area having a smaller outer diameter is provided between two adjacent enlargements.

8. A method according to claim 1, wherein the ratio of the length to the maximum thickness of the sealing ring means is about 2.5:1 to about 5:1.

9. A method according to claim 1, wherein the elongated sealing ring means is composed of two semi-circularly shaped sections—as viewed in cross section—which are connected with each other by a thin-walled web.

10. A method according to claim 9, wherein radial bead means are locally provided at the insert means, the sealing means being mounted on said bead means, whereby the circularly shaped sections of the sealing ring means are supported at the bead means.

11. A method according to claim 10, wherein the outwardly protruding beam means are constructed spherically shaped whereby said bead means are shaped in such a manner that the end-face circularly shaped sections of the sealing ring means are sectionwise in abutment at the terminal radii of the bead means.

* * * * *